Feb. 5, 1957
L. A. MEDLAR
2,780,781
MUTUAL INDUCTION METHOD OF AND MEANS
FOR MEASURING CURRENT DENSITY
Filed June 4, 1952
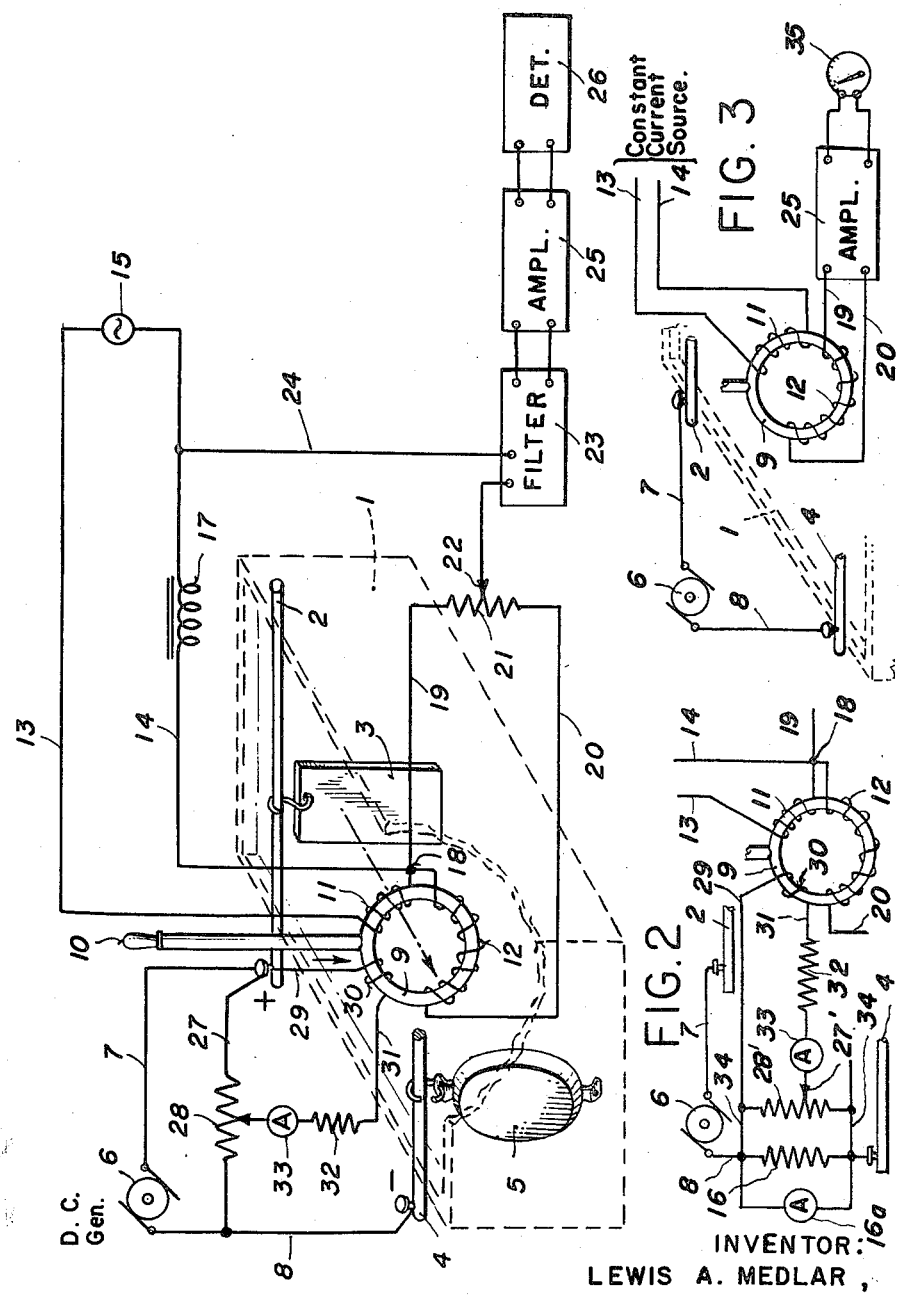
INVENTOR:
LEWIS A. MEDLAR,
BY Stone, Boyden & Mack,
ATTORNEYS

United States Patent Office 2,780,781
Patented Feb. 5, 1957

2,780,781

MUTUAL INDUCTION METHOD OF AND MEANS FOR MEASURING CURRENT DENSITY

Lewis A. Medlar, Oreland, Pa., assignor to Fox Products Company, Philadelphia, Pa., a corporation of Pennsylvania Application June 4, 1952, Serial No. 291,628

5 Claims. (Cl. 324—117)

This invention relates to a method of and apparatus for measuring the density of the current flowing through a bath of conducting liquid, and more particularly for measuring the current density at any desired point in such a bath.

In application Ser. No. 231,352, filed June 13, 1951, by Goldshalk, Keck and myself, now abandoned and superceded by continuation-in-part application Ser. No. 252,742, filed October 23, 1951, in turn abandoned and superceded by continuation-in-part application Ser. No. 407,418, filed February 1, 1954, and in application Ser. No. 255,233, filed November 7, 1951, by Gerard Rezek, various methods and means are disclosed for accomplishing the same general result. In the specific apparatus described in both of these applications it was necessary for the current in the bath to be measured to be a periodically varying one, or at least to have a periodic or pulsating component.

In application Ser. No. 260,369, filed December 7, 1951, by Gerard Rezek, there is disclosed still another method and apparatus for the same general purpose, but in this latter case the current in the bath may be a perfectly uniform, direct current.

The present invention, like that disclosed in the second above mentioned application of Gerard Rezek is designed to measure the density of a uniform, direct current flowing through a bath.

Also, the present invention may employ either the null or the direct method of measuring, as desired.

As in all of the above mentioned applications, I employ a freely movable, ring-like core of magnetic material, adapted to be immersed at any desired point in the bath, and having one or more coils of insulated wire wound thereon. Specifically, however, I employ such a core having two coils wound thereon in a novel manner, acting as primary and secondary transformer windings, and depend upon the changes in the mutual induction between these two coils to accomplish the desired results.

I achieve my measurements, in the present invention, when using the null method, by comparing a voltage, varying with the current to be measured, with a standard voltage, the two voltages under certain conditions, being equal and opposite, and thus balanced. To this end I connect the primary winding on the core in series with a standard inductance, and supply such winding with a periodic current, whereby an alternating voltage is generated in the secondary winding, and I then compare the output of this secondary winding with the voltage drop across the standard inductance. The output of this secondary winding varies with the flow of current through that part of the bath in which the core is immersed, due to the setting up of a D. C. flux in the core by such current, which flux affects the mutual induction between the two windings. I further provide means for neutralizing the D. C. flux in the core by current in an auxiliary circuit, and utilize the value of such current for indicating the density of the current flowing through the bath.

In order that the invention may be readily understood, reference is had to the accompanying drawing, forming part of this specification, and in which:

Fig. 1 is a diagrammatic view showing my improved arrangement of core and windings, when employing the null method of measuring, and illustrating in broken lines a conventional plating vat.

Fig. 2 is a fragmentary diagrammatic view, similar to Fig. 1, but showing a different arrangement of auxiliary circuit; and Fig. 3 is a fragmentary diagrammatic view, omitting the auxiliary circuit, and showing a direct method of measuring.

Referring to the drawing in detail, and more particularly first to Fig. 1 thereof, a conventional electro-plating vat is indicated at 1, having the anode and cathode bars 2 and 4, respectively, from which are suspended a plate of metal 3 and an article 5 to be plated.

Uniform direct current is supplied to the anode and cathode bars from a D. C. generator 6 through wires 7 and 8.

9 designates a ring-like core of magnetic material which is freely movable and is provided with a handle 10 by which it may be readily manipulated and immersed into the electrolytic bath at various points.

On this core 9 is wound a primary winding 11 and a secondary winding 12, the latter preferably comprising a greater number of turns than the former. The coil or winding 11 is connected by conductors 13 and 14 to a source of periodic current such as an alternating generator 15, of constant voltage, the conductor 14 including a standard inductance 17.

The terminals of the secondary winding 12 are connected by wires 19 and 20 to the ends of the resistance 21 of a potentiometer, the wire 19 being tied to the wire 14 at 18.

The slide 22 of the potentiometer is connected to one side of a filter 23, in cases where a filter is found desirable, and the other side of the filter is connected by wire 24 with the conductor 14 at a point between the generator 15 and the inductance 17. The filter feeds into an amplifier 25 and this in turn is connected with a detector 26. In the event that a filter is not employed, the slide 22 and wire 24 will be connected directly with the terminals of the amplifier.

Since the voltage drop across the inductance 17, and the voltages inducted in both the primary and secondary windings 11 and 12 are all in quadrature with the current from generator 15, they will all be in phase with each other. The above described connections, including the tie-in 18, are such that the voltage drop across the inductance 17 is in series opposition with the output of the secondary winding 12 so that these two voltages buck each other. The coils are so designed that, if there is no D. C. flux in the core 9, these opposing voltages are substantially equal, and no current flows in the series circuit containing the coils 12 and 17. The purpose of the amplifier and detector 25 and 26 is to detect and indicate any difference which may exist between these two voltages. The purpose of the potentiometer 21 is merely to compensate for production irregularities so that the output of the secondary 12 may be balanced against the drop across the inductance 17. The potentiometer resistance 21 is preferably very large, compared with any of the other resistances, so that the current flowing in the secondary winding 12 approaches zero. If thus constructed, the potentiometer, once having been adjusted to balance the drop across the inductance 17, is thereafter left unchanged.

The voltage drop across the primary winding 11 and the resulting output of the secondary 12 vary with the amount of current flowing through the bath when the core 9 is immersed in the bath. This core is to be placed in such a position that current flowing in the bath passes through the opening thereof, and current flowing through the area enclosed by the ring-like core tends to set up or generate a D. C. flux in this core. In referring to "the area enclosed by the ring-like core," in the preceding sentence, it was assumed that, as indicated in the drawing, the core is so positioned that its plane lies at substantial right angles to the direction of current flow through the bath. But this right angled relationship, while preferable, is by no means essential. All that is necessary is that the core be placed in such angular position that the current flowing in the bath passes through the opening thereof. When the core is placed at right angles to the direction of current flow, the entire area enclosed is the effective area used in determining the current density in the bath. If however, the core is so placed that its plane lies at some angle less than a right angle, to the direction of current flow, then the effective area is the projection of the actual area on a plane lying at right angles to the direction of current flow, and this projected, effective area is proportional to the cosine of the angle which the core makes with such plane. Thus the effective area may be readily computed, or a meter calibrated, for any given angular position of the core. Where, therefore, in the specification and claims, reference is made to the "area" of the core, or the "area enclosed" thereby, the effective area, as above defined, is intended. As is well understood, the presence of a D. C. flux in the core results in reducing the output of the secondary winding 12, and under these conditions this output would no longer balance the drop across the inductance 17, and the detector 26 would indicate a difference in the value of these two voltages.

In order to neutralize the resultant flux in the core 9 and thus bring about a balance between the drop across the inductance and the output of the secondary winding 12, I provide a shunt circuit 27 across the leads 7 and 8 from the generator 6, including a resistance 28. A conductor 29 extends from one end of this shunt and surrounds the core 9 with one or more turns 30. A conductor 31 connects the other end of the turn or turns through a resistance 32 to one side of a measuring instrument 33, such as an ammeter, the other side of which is connected with a slide which is adjustable over the resistance 28. Thus, the conductors 29 and 31 and turn or turns 30 constitute an auxiliary circuit connected with a shunt deriving current from the same source, namely the D. C. generator 6, as that which supplies current to the bath. While I have shown the auxiliary circuit as deriving current from the same source as that which supplies the bath, a separate source, such as a battery, or other D. C. generator can, if desired, be employed to supply the auxiliary circuit.

It will be noted that the turn or turns 30 are wound in such a manner that the current passes around the inside of the core in a direction opposite to that in which current in the bath flows through the area enclosed by the core. Thus, the current flowing in the auxiliary or shunt circuit through the turn or turns 30 generates a flux in the core 9 which tends to oppose and neutralize the flux generated by the current flowing in the bath through the area of the ring-like core. By adjusting the slide on the resistance 28 it is possible to cause the current, through the turns 30, to generate a flux which will just balance the flux generated by the current flowing through the bath. When such balance occurs, the detector 26 will indicate it by showing that the voltage drop across the inductance 17 is equal to the output of the secondary winding 12. The current in the auxiliary circuit, as shown by the ammeter 33, will then serve to indicate the density of the current flowing in the bath through the area enclosed by said core. If there is only a single turn 30 around the core, then the current flowing through the ammeter will be exactly the same as the current flowing in the bath through the area enclosed by the core. If there are two turns 30, then the ammeter reading will indicate a value equal to one-half the amount of current flowing in the bath, etc. The ammeter may be graduated in any desired manner as, for example, in amperes per square foot of cross sectional area of the bath.

From the foregoing it will be seen that my improved method depends upon comparing or balancing the variable voltage in the secondary winding 12 with the voltage drop across the standard inductance 17, and that when these voltages are balanced, as indicated by the detector, the reading of the ammeter in the shunt or auxiliary circuit will indicate the density of the current flowing through that part of the bath in which the core is immersed.

It will be particularly noted that the coils 11 and 17 are in series, and, since the generator 15 delivers a constant voltage, it follows that, when the voltage drop across the coil 11 decreases, due to the D. C. flux set up in the core 9 by the current in the bath, the voltage drop across the coil 17 increases. By thus causing the standard voltage to shift in the opposite direction from that of the unknown voltage, the difference between these two voltages is increased, and the sensitivity of the apparatus is improved accordingly, as pointed out in the above mentioned Rezek application Ser. No. 260,369.

The detector 26 may be of any suitable or desired type, a device known commercially as the "magic eye" being preferred.

While I have illustrated the core 9 as in the form of an annulus and have described it as "ring-like," it will be understood that by this term I mean to include a closed magnetic path of any form as, for example, elliptical, rectangular, square, hexagonal or of the shape of any regular or irregular polygon, as illustrated and described in the said applications of Godshalk, Keck and myself.

While I have shown in Fig. 1 an arrangement of coil and of auxiliary and shunt circuits similar to that illustrated in Fig. 1 of the above identified application of Gerard Rezek, Ser. No. 260,369, it will be understood that the present invention is by no means limited to this, but is equally applicable to other circuit arrangements, such, for example, as the series resistor or meter shunt arrangement illustrated in Fig. 3 of said Rezek application, and in present Fig. 2.

Referring to this figure, it will be seen that a resistor or low resistance meter shunt 16, having an ammeter 16ª connected with it, is interposed in one of the leads supplying the bath, as, for example, the lead 8. Bridged across this shunt, by means of wires 34, is a relatively high resistance potentiometer 28'. The auxiliary circuit includes the conductor 29, connected with one side of the shunt and potentiometer, and the conductor 31, terminating in the slide 27', adjustable along the potentiometer 28', the resistance 32 and ammeter 33 being interposed in this circuit, as in Fig. 1.

While I have shown and described the current through the bath as a uniform, direct current, it may also be a uni-directional pulsating current, such as that derived from a rectifier fed with alternating current. If, in this case, the auxiliary circuit is supplied from the same source, as by means of a meter shunt in series with the anode or cathode bars, as shown in Fig. 2, then the balancing current in the auxiliary circuit will be of exactly the same character as the bath current, and hence the output from coil 12 and the voltage drop across standard inductance 17 may be balanced in the manner above described. If however, the auxiliary circuit is supplied from a separate source of direct current, different from the pulsating source supplying the bath, the output from the coil 12 and the voltage drop across coil 17 will be periodically unbalanced, first in one direction and then in the other. This periodic unbalancing would make the determination of the balance point a little more difficult, but it can, nevertheless, be done by known means.

While, in Figs. 1 and 2, I have shown arrangements employing a null method of measurement, the invention, in its broader aspects, may also be embodied in apparatus in which a direct method of measurement is used. This is illustrated in Fig. 3.

Referring to this figure, it will be seen that the shunt and the auxiliary circuit are omitted as are also the tie-in connection 18 between the coils 11 and 12, the connection 24, and the potentiometer 21. Instead, I connect the terminals of coil 12 directly with the amplifier 25, and connect the output of the amplifier to a suitable indicating meter 35. Either the standard inductance 17 is retained in the circuit of coil 11, as in Fig. 1, to limit the amount of current flowing there through, or else a constant current source is used in place of the generator 15, as indicated in Fig. 3. The mutual induction between coils 11 and 12 depends upon the amount of D. C. flux in the ring 9, and this varies with the density of the current flowing through that part of the bath in which the ring is immersed, so that the output of coil 12 is proportional to such current. The meter 35 may be calibrated to read directly in terms of current density.

Where, in the appended claims, I use the phrase "direct current," I intend it to include a uni-directional pulsating current as well as a uniform current.

What I claim is:

1. The combination with a liquid-conducting medium having a pair of spaced electrodes therein and a direct current source connected to said electrodes to cause a direct current to flow through the medium from one of the electrodes to the other, of an apparatus responsive to the density of said direct current at a location in the medium, including a magnetic core of high permeability immersed in the medium defining a substantially closed path substantially enclosing a cross-sectional area which is small in comparison with the total cross-sectional area of the medium through which said current flows, said core being so locatable that the cross-sectional area it encloses is at an angle with respect to the direction of flow of said current, whereby one portion of said current flows through said cross-sectional area enclosed by the core in one direction and another portion of said current flows only outside of said last-mentioned cross-sectional area and in substantially the same direction, said core forming the core of a transformer having a primary coil and a secondary coil wound thereon, a source of periodic constant amplitude voltage, an impedance, a circuit connecting said impedance and said primary coil in series across said source of periodic voltage, means for comparing the voltage across the impedance with the voltage across the secondary coil to provide an indication of their difference, said difference having a certain magnitude when there is no direct current flowing through said medium, a third coil of at least one turn wound on the core, means for supplying said third coil with direct current to produce a flux in the core opposing that produced by said direct current flowing through said medium, said supplying means including means for adjusting the magnitude of current flowing through the third coil, and a current measuring device connected in said supplying means to measure the magnitude of current flowing through said third coil, whereby the current through said third coil may be adjusted until said comparing means indicates said certain magnitude of difference between the voltage across said impedance and said secondary coil with direct current flowing through said medium, and said current measuring device then indicates the magnitude only of said one portion of the direct current flowing through the medium.

2. Apparatus as defined in claim 1 including a second impedance connected across said secondary coil having an impedance very much higher than the impedance of said secondary coil and said first-mentioned impedance, and circuit means connecting at least a portion of said second impedance and said first-mentioned impedance is series opposition to said comprising means.

3. Apparatus as defined in claim 2 in which said first-mentioned impedance is a standard inductance and said second impedance is a potentiometer having its slider connected to said circuit means.

4. Apparatus as defined in claim 1 in which said means for supplying said third coil with direct current includes said direct current source connected to said electrodes, and a potentiometer having its ends connected across said direct current source, one end of said third coil being connected through said current measuring device to the slider of the potentiometer and the other end being connected to one end of the potentiometer.

5. Apparatus as defined in claim 1 in which said means for supplying said third coil with direct current includes said direct current source connected to said electrodes, a low value resistance connected in series with said direct current source, and a potentiometer having its ends connected across said resistance, one end of said third coil being connected through said current measuring device to the slider of the potentiometer and the other end being connected to one end of the potentiometer.

References Cited in the file of this patent

UNITED STATES PATENTS

| | | |
|---|---|---|
| 1,524,285 | Besag | Jan. 27, 1925 |
| 1,735,878 | Pfanhauser | Nov. 19, 1929 |
| 1,825,514 | Fitzgerald | Sept. 29, 1931 |
| 2,542,057 | Relis | Feb. 20, 1951 |